May 6, 1969        J. P. GLASS        3,442,415
FOAMED PLASTIC CONTAINER WITH HINGED CLOSURE
Original Filed Oct. 6, 1964
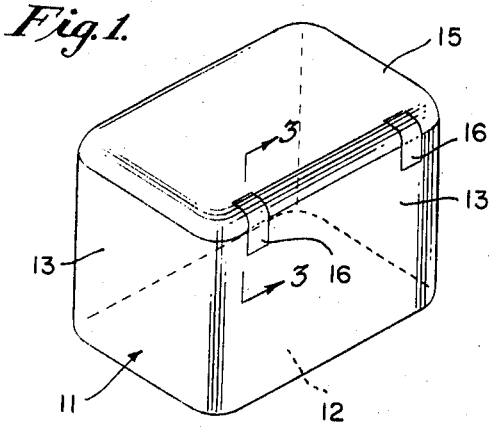
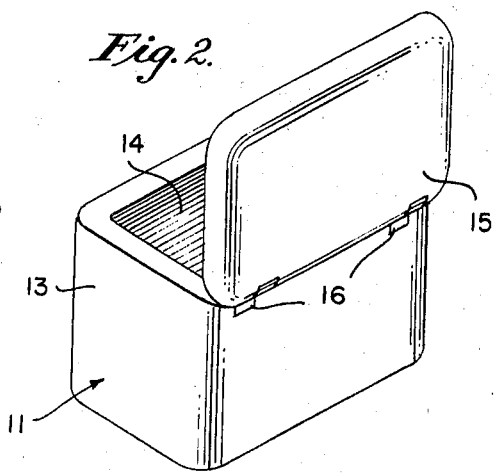
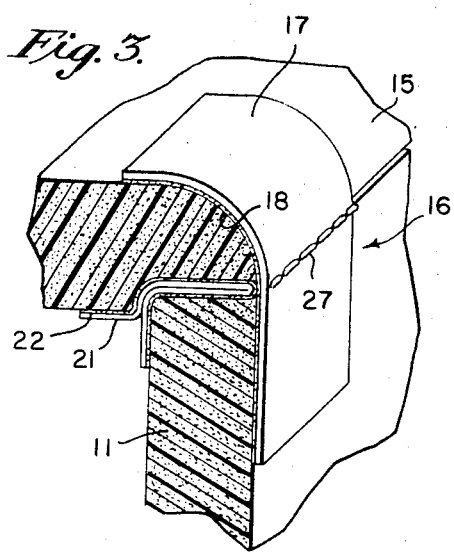
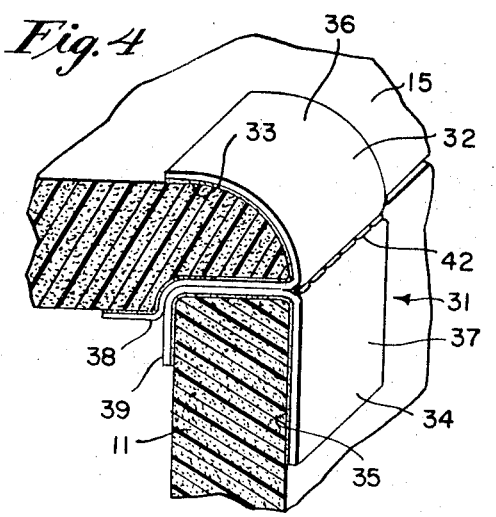
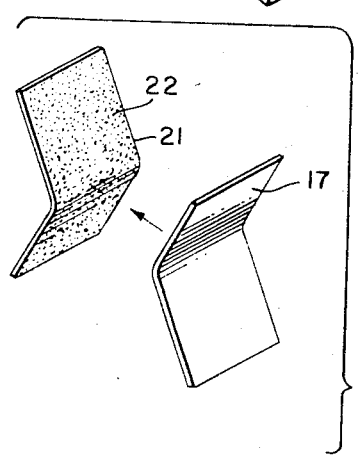
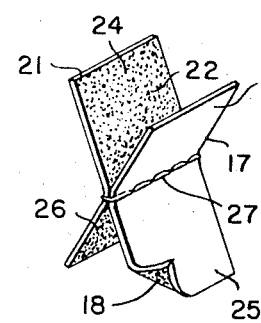
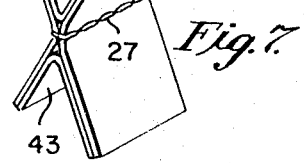
INVENTOR.
JOHN P. GLASS
BY
John F. A. Earley
ATTORNEY.

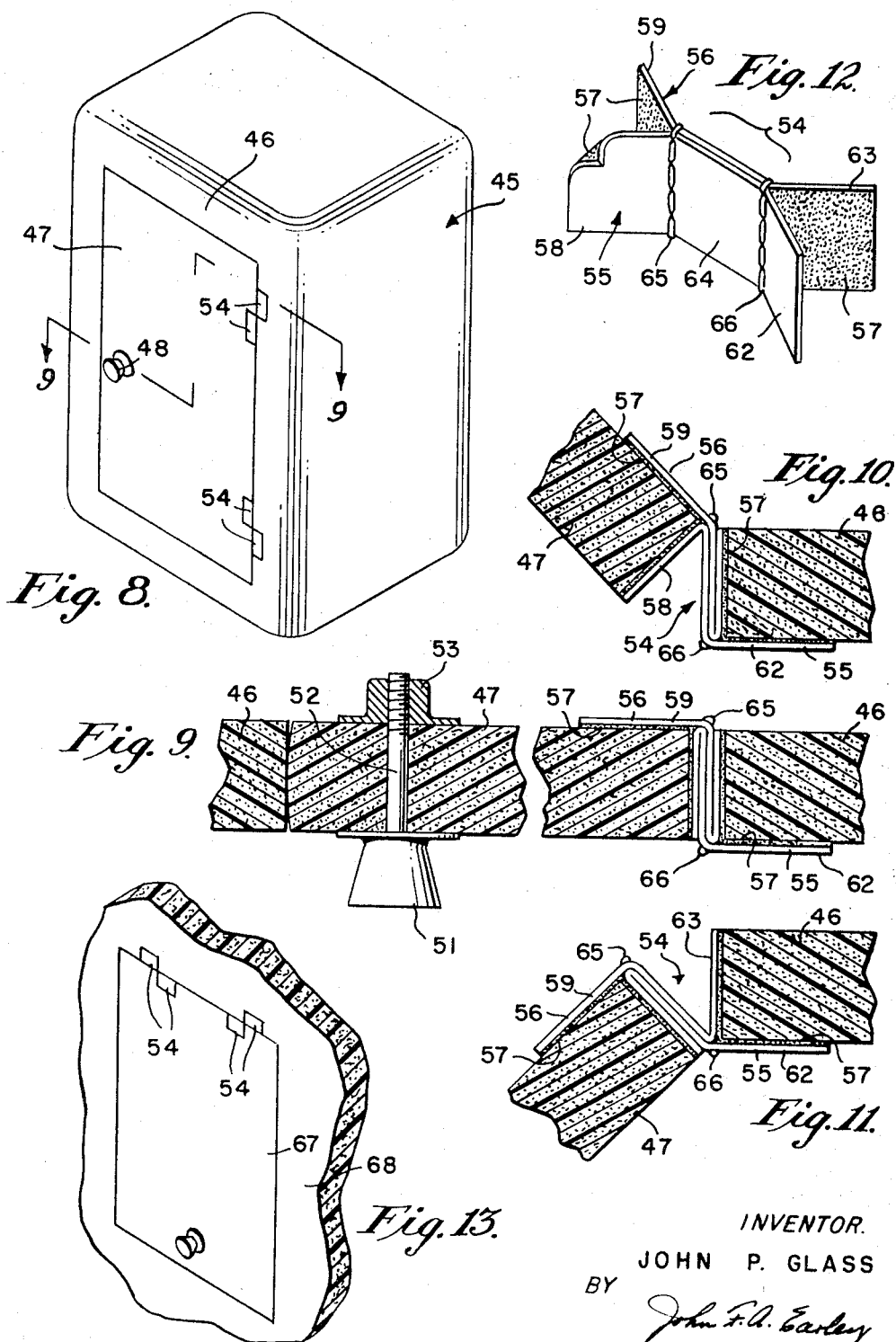

United States Patent Office 3,442,415
Patented May 6, 1969

3,442,415
FOAMED PLASTIC CONTAINER WITH HINGED CLOSURE
John P. Glass, Ardmore, Pa. (% Cava Industries, 79 La Grange Ave., Essington, Pa. 19029)
Original application Oct. 6, 1964, Ser. No. 401,893, now Patent No. 3,397,806, dated Aug. 20, 1968. Divided and this application May 23, 1968, Ser. No. 731,501
Int. Cl. B65d 43/16, 51/04; E05d 1/02
U.S. Cl. 220—32                                8 Claims

ABSTRACT OF THE DISCLOSURE

A hinge for a plastic foam container comprising a first tape having adhesive on one surface, a second tape having adhesive on one surface, a seam of thread connecting the tapes together at their mid-sections, with the adhesive surfaces of the tapes facing away from each other so that the tapes form a hinge for a plastic foam container having a lid and a body, with the tape sections of the first tape being fastened to the lid and the tape sections of the second tape being fastened to the body.

In another embodiment of the invention, the tapes include a mid-section panel positioned between two end panels and a seam of thread connects the tapes together at each end of the mid-section panel, and the upper tape sections are fastened to a body of a foam plastic container and the lower tape sections are fastened to a door so that the mid-section panel extends from one side of the door to the other, whereby the door is adapted to swing freely about both hinges formed by the seams of thread.

Cross-references to related applications

This application is a division of my pending patent application Ser. No. 401,893, filed Oct. 6, 1964, now Patent No. 3,397,806, and it is directed to species which were non-elected in the pending application.

Background of the invention

This invention relates to plastic foam containers, and more particularly concerns such a container which is provided with a hinged lid, and is also concerned with a hinge which is adapted for use with plastic foam containers and the like.

Plastic foam containers are widely used today because of their light weight and good heat insulating properties. They find use as ice buckets, picnic coolers, bread boxes, and so on. Such containers are generally provided with a body and a separate lid. The lid is separate because it has been a problem to provide a hinge to attach it to the body because of the structural weakness of the plastic foam. For example, a metal hinge cannot be used because it is too heavy and clumsy.

Summary of the invention

Accordingly, it is an object of this invention to provide a hinge which is adaptable for use with plastic foam containers and other structurally weak materials. It is another object to provide a hinge which provides for opening of a closure member in one direction only, and also to provide hinge apparatus which provides for opening the closure member in both the inward and outward directions.

It is another object to provide an improved hinged plastic foam container and the like.

Brief description of the drawings

Other objects and advantages of the invention, including its simplicity and economy, as well as the ease with which it may be adapted to existing equipment, will further become apparent hereinafter and in the drawings, in which:

FIG. 1 is a view in perspective of a hinged plastic foam container constructed in accordance with this invention;

FIG. 2 is a view in perspective of the container of FIG. 1, but with the lid open;

FIG. 3 is a fragmentary view in section, and on an enlarged scale, taken as indicated by the lines and arrows 3—3 which appear in FIG. 1;

FIG. 4 is a view in section of another embodiment of the invention;

FIG. 5 shows the two hinge tapes of FIG. 3 before they are connected together;

FIG. 6 shows the two hinge tapes of FIG. 3 after they are connected together at their mid-section;

FIG. 7 shows the hinge of FIG. 6 with removable covers on the adhesive surfaces of the tapes;

FIG. 8 is a view in perspective of another embodiment of the invention which illustrates a container having a closure member in the form of a door;

FIG. 9 is a view in section and on an enlarged scale taken as indicated by the lines and arrows 9—9 which appear in FIG. 8;

FIG. 10 is a fragmentary view which illustrates the position of the hinge elements of FIG. 9 when the door is opened inwardly;

FIG. 11 is a view similar to FIG. 10 but shows the position of the hinge elements when the door is opened outwardly;

FIG. 12 shows the hinge of FIGS. 8–11 before it is affixed to the container; and FIG. 13 is a view of a door having hinges at the top rather than at the side.

Description of the preferred embodiments

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown, in FIGS. 1–4, a plastic foam container which comprises a body 11 that has a bottom 12 with side walls 13 extending upwardly therefrom to form an opening 14. A closure member of lid 15 is joined to body 11 by a hinge 16.

Hinge 16 includes a first tape 17 which has an adhesive layer 18 on one surface, and a second tape 21 which also has an adhesive layer 22 on one surface.

Means are provided for connecting tapes 17 and 21 together at their mid-section to form upper tape sections 23 and 24 and to form lower tape sections 25 and 26. The connecting means is adapted to form a hinge pivot with a pair of the tape sections being fastened to the lid 15 of the container and the other pair of tape sections being fastened to the body 11.

In the embodiment of the invention illustrated in FIG. 3, the means connecting tapes 17 and 21 together at their mid-section is a seam 27 of thread. In this embodiment, the adhesive layers 18 and 22 face each other and upper tape sections 23 and 24 are fastened to lid 15, while lower tape sections 25 and 26 are fastened to body 11.

The embodiment of the invention illustrated in FIG. 4 is of different construction. There, a hinge 31 is provided which has a first tape 32 with an adhesive layer 33 and a second tape 34 with an adhesive layer 35.

Means are provided for connecting tapes 32 and 34 together at their mid-section to form upper tape sections 36 and 37, and to form lower tape sections 38 and 39.

In the FIG. 4 embodiment, the adhesive layers 33 and 35 are faced away from each other, and the tape sections 36 and 38 of first tape 32 are fastened to lid 15, and the tape sections 37 and 39 of second tape 34 are fastened to body 11. The connecting means between tapes 32 and 34, illustrated in FIG. 4, is a seam 42 of thread which forms the hinge pivot. The thread of seam 42 is the only connection between lid 15 and body 11, whereas the embodiment of FIG. 3 they are connected together by first tape 17 and by second tape 21. Accordingly, the hinge of FIG. 3 is stronger and is to be preferred over the hinge of FIG. 4.

The seam or connection between the first and second tapes holds the two tapes together and prevents them from being peeled away from the container.

FIG. 5 illustrates the two tapes of the hinge of FIG. 3 before they are attached together at their mid-section, and FIG. 6 shows the hinge after the two tapes have been connected together. FIG. 7 shows the hinge of FIG. 6 as it is packaged for use with conventional non-hinged plastic foam containers, and illustrates covers 43 on the adhesive surfaces. The covers are removable, and may be peeled away just prior to attaching the hinge to the container.

In the embodiment of the invention illustrated in FIGS. 8–13, there is shown a plastic foam container which comprises a body 45 that has a top and bottom, side walls, and front and back walls. The front wall forms a door frame 46 which has positioned therein a door 47.

Door 47 is made of a foamed plastic material, as is body 45 and is a swinging door which opens outwardly or inwardly as desired. A knob 48 is provided for door 47 and includes a flanged handle 51 which has a stem 52 extending therefrom through the door. The stem 52 is threaded at its end and a flanged nut 53 is threaded thereon. The flanges of nut 53 and handle 51 distribute the compressive force between the two elements over a larger area of the foamed plastic material of the door.

A pair of hinge means are provided for joining door 47 to door frame 46. Each of these hinge means includes two hinges 54 which have a first tape 55 and a second tape 56 with an adhesive layer 57 on one surface.

Connecting means are provided for joining tapes 55, 56 together at their mid-section to form upper tape sections 58, 59 and lower tape sections 62, 63 with a mid-section panel 64 therebetween.

The adhesive surfaces or layers 57 of tapes 55, 56 face each other.

The connecting means may be a pair of seams 65, 66 of thread which form a pair of hinge pivots.

Hinges 54 are used in pairs, and the upper tape sections 58, 59 of one hinge are adhesively fastened to door frame 46 and the lower tape sections 62, 63 of that hinge are adhesively fastened to door 47 with mid-section panel 64 extending from one side of the door to the other in one direction. As for the other hinge of the pair, the upper tape sections 58, 59 are adhesively fastened to door 47 and the lower tape sections 62, 63 are fastened to door frame 46 with the mid-section panel 64 extending from one side of door 47 to the other side of frame 46 in the other direction from that of the mid-section panel of the companion hinge of the pair.

In other words, in one hinge of the pair the seam 65 is positioned at the inner edge of door 47 and the seam 66 is positioned at the outer edge of door frame 46 so that mid-section panel 64 is connected therebetween. The other hinge of the pair, however, has its seam 65 positioned at the outer edge of door 47 and its seam 66 positioned at the inner edge of door frame 46 so that its mid-section panel 64 extends therebetween.

As may be seen from an examination of FIGS. 9 through 11, seams 65 and 66 act as hinge pivots, with the door 47 pivoting about one hinge pivot when it is opened inwardly, and pivoting about the other hinge pivot when it is opened outwardly.

FIG. 13 shows a door 67 mounted in a door frame 68, with the door having its hinges 54 at the top instead of at the side as in the door of FIG. 8. It is to be realized that the mid-section panels 64 of the pairs of hinges 54 prevent the door from sagging away from the door frame because adjacent mid-section panels 64 have adjacent seams connected to the door and the door frame, respectively.

The hinge of the present invention provides means for hinging together a lid, door, and the like, to the body of a container made of soft, structurally-weak material such as plastic foam. The material of the container may be styrafoam, polystyrene, urethane, and the like. The tapes may be made of fabric.

The hinge of the present invention matches the strength of the hinge to the strength of the container parts to be hinged together.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. In the claims the term "lid" is defined as meaning a lid, a door, and the like.

I claim:

1. A hinge for a plastic foam container and the like, comprising a first tape having adhesive on one surface, a second tape having adhesive on one surface, and means connecting the tapes together at their mid-sections to form upper and lower tape sections, said adhesive surfaces of the tapes facing away from each other, said tapes and connecting means being adapted to form a hinge for a container having a lid and a body, with the tape sections of the first tape being fastened to the lid and the tape sections of the second tape being fastened to the body.

2. The hinge defined in claim 1, wherein the connecting means is a seam of thread.

3. A plastic foam container and the like, comprising a body having a bottom with side walls extending upwardly therefrom to form an opening, a lid covering said opening, and a hinge joining the lid to the body, said hinge including a first tape having adhesive on one surface, a second tape having adhesive on one surface, and means connecting the tapes together at their mid-section to form upper and lower tape sections, said adhesive surfaces of the tapes facing away from each other, said tapes and connecting means forming a hinge with the tape sections of the first tape being fastened to the lid of the container and the tape sections of the second tape being fastened to the body.

4. The container defined in claim 3, wherein the connecting means is a seam of thread.

5. A hinge for a plastic foam container and the like, comprising a first tape having adhesive on one surface, a second tape having adhesive on one surface, and means connecting the tapes together at their mid-section to form upper and lower tape sections with a mid-section panel therebetween, said adhesive surfaces of the tapes facing each other, said connecting means being adapted to form a pair of hinge pivots for a plastic foam container having a body and a door, said upper tape sections being fastened to said body and said lower tape sections being fastened to said door with said mid-section panel extending from one side of the door to the other, whereby said door is adapted to swing freely about both hinge pivots.

6. The hinge defined in claim 5, wherein said connecting means is a pair of seams of thread.

7. Swinging door apparatus for plastic foam containers and the like, comprising a door frame, a door positioned in the door frame, and a pair of hinge means joining the door to said frame, each of said hinge means including two hinges having a first and a second tape with adhesive on one surface, and means connecting the tapes together at their mid-section to form upper and lower tape sections with a mid-section panel therebetween, said adhesive surfaces of the tapes facing each other, said connecting means forming a pair of hinge pivots, said upper tape sections of one hinge being fastened to said door frame and said lower tape sections being fastened to said door with said midsection panel extending from one side of the door to the other in one direction, said upper tape sections of the other hinge being fastened to said door frame with said midsection panel extending from one side of the door to the other side of said frame in the other direction, whereby said door is adapted to swing inwardly and outwardly.

8. The swinging door apparatus defined in claim 7, wherein said connecting means is a pair of seams of thread.

References Cited

UNITED STATES PATENTS

| | | | |
|---|---|---|---|
| 573,529 | 12/1896 | Pollard | 16—150 |
| 913,054 | 2/1909 | Robbins | 229—44 |
| 1,167,070 | 1/1916 | Hoerr | 220—32 |
| 2,552,641 | 5/1951 | Morrison | 220—9 |
| 3,105,376 | 10/1963 | Hashett | 220—9 |
| 3,149,771 | 9/1964 | Pearl | 229  48 |
| 3,225,983 | 12/1965 | Majke | 220—9 |
| 3,385,422 | 5/1968 | Lowry | 206—45.34 X |

GEORGE T. HALL, *Primary Examiner.*

U.S. Cl. X.R.

16—150; 217—57